Figure 1:
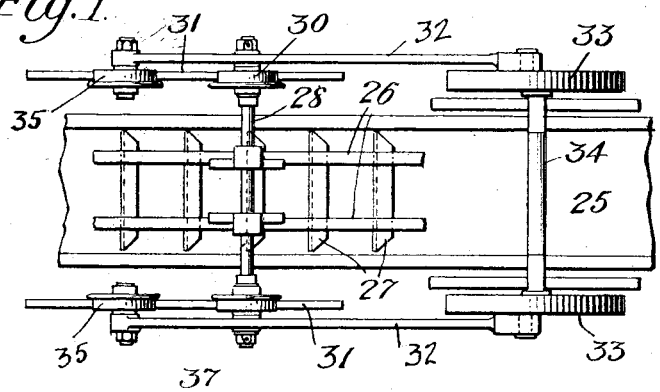

D. J. NEVILL.
CONVEYER OR STIRRER.
APPLICATION FILED FEB. 10, 1910.

1,067,365.

Patented July 15, 1913.

5 SHEETS—SHEET 1.

Witnesses.

Inventor

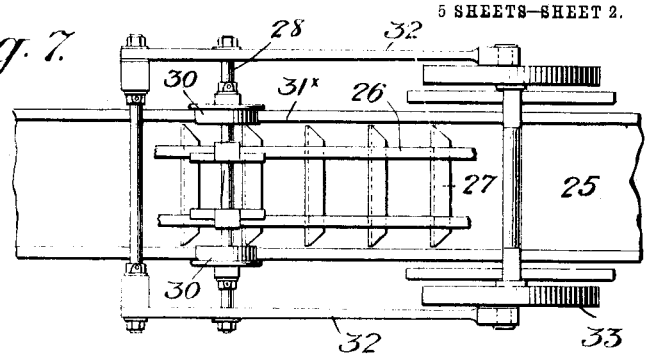
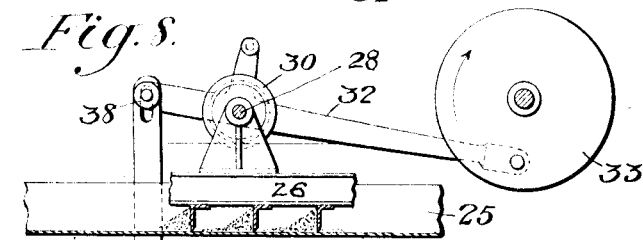
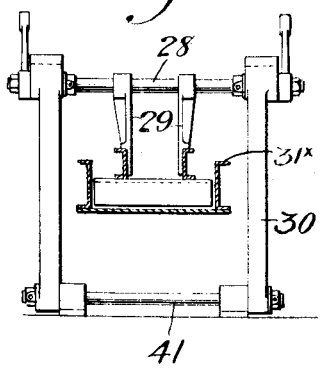
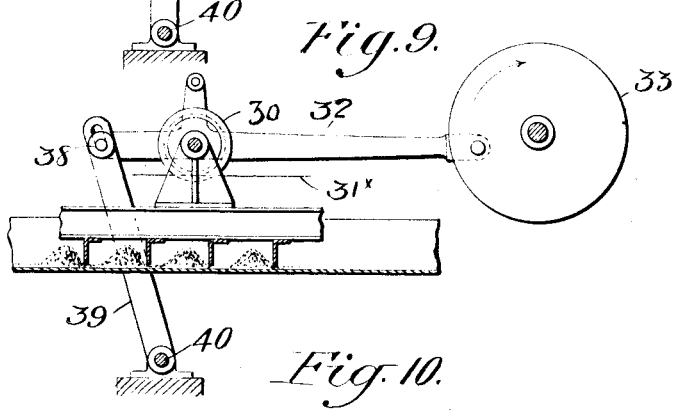
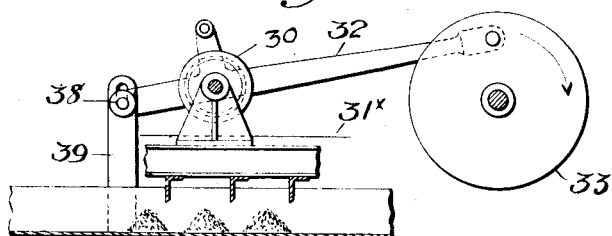

D. J. NEVILL.
CONVEYER OR STIRRER.
APPLICATION FILED FEB. 10, 1910.
1,067,365.
Patented July 15, 1913.
5 SHEETS—SHEET 3.
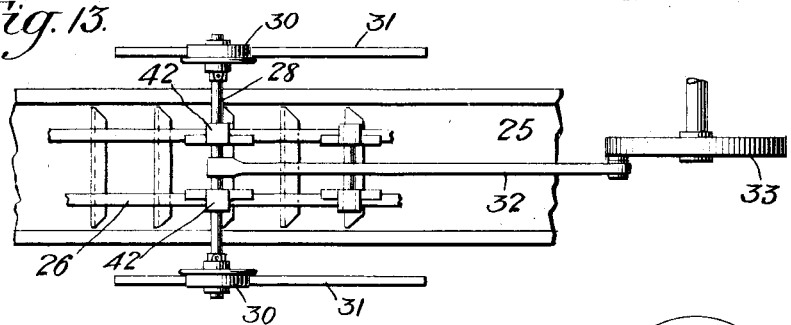
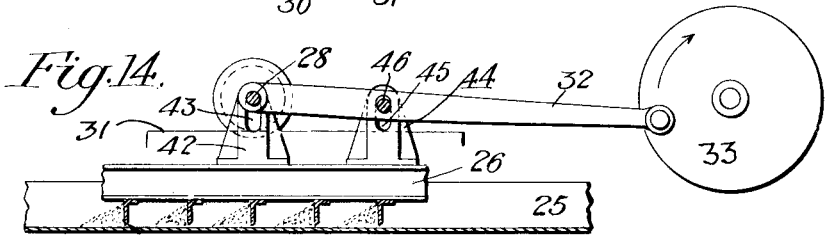
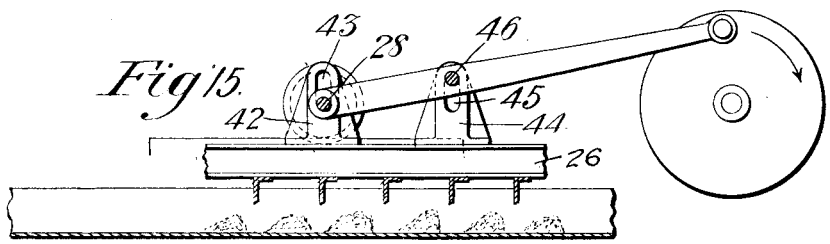
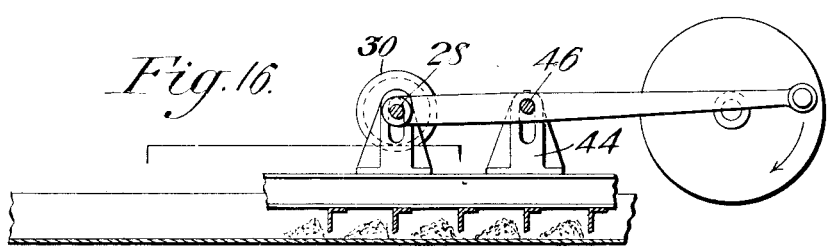
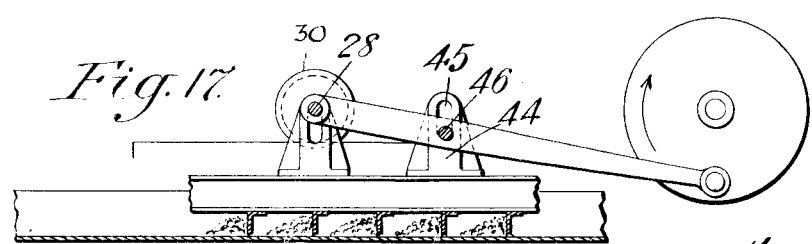
Witnesses.
Inventor.

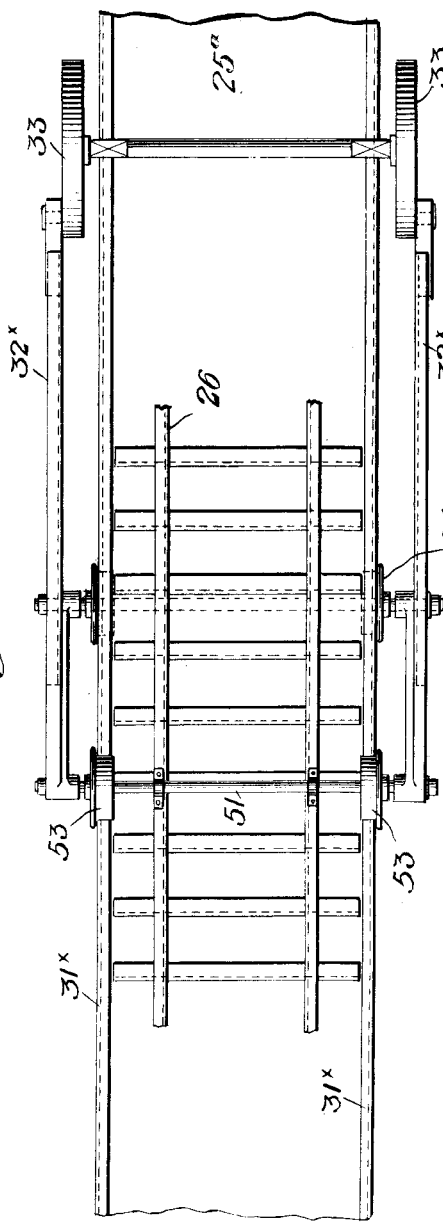
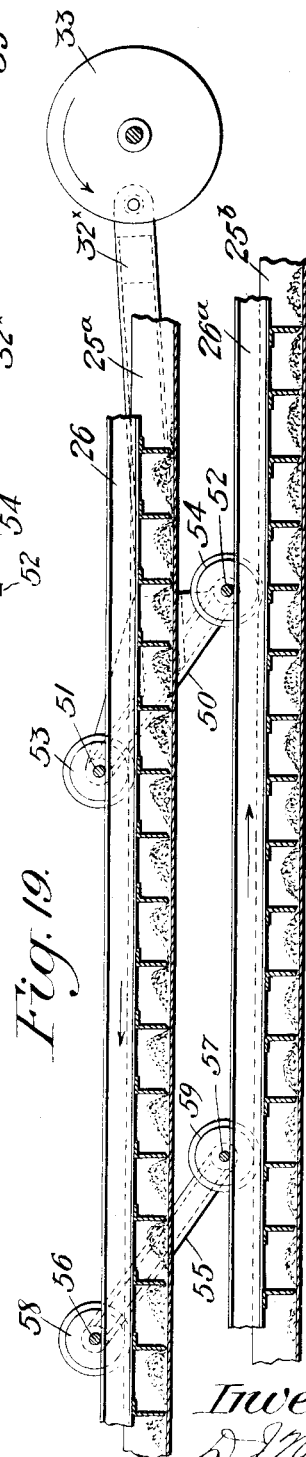

D. J. NEVILL.
CONVEYER OR STIRRER.
APPLICATION FILED FEB. 10, 1910.
1,067,365.
Patented July 15, 1913.
5 SHEETS—SHEET 5.
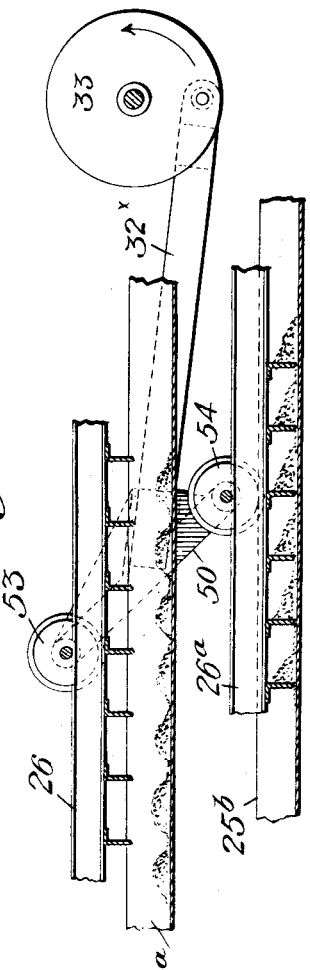
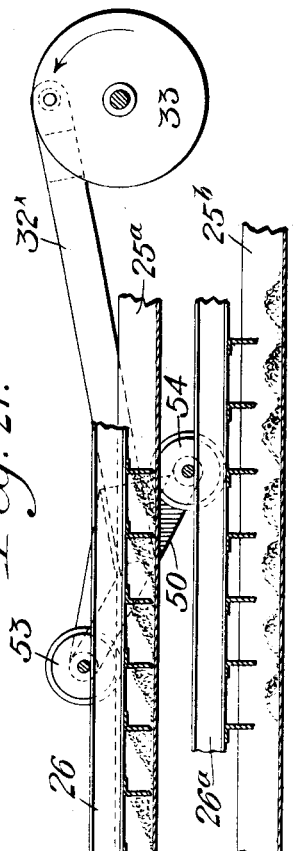
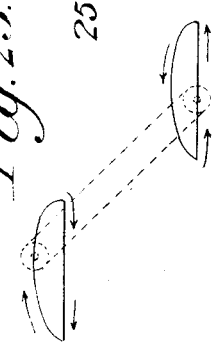
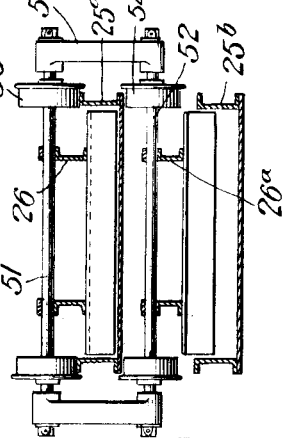

UNITED STATES PATENT OFFICE.

DAVID J. NEVILL, OF DENVER, COLORADO.

CONVEYER OR STIRRER.

1,067,365.  Specification of Letters Patent.  Patented July 15, 1913.

Application filed February 10, 1910. Serial No. 543,130.

*To all whom it may concern:*

Be it known that I, DAVID J. NEVILL, a citizen of the United States, and resident of Denver, county of Denver, and State of Colorado, have invented certain new and useful Improvements in Conveyers or Stirrers; and I do hereby declare the following to be a full, clear, and exact description of the invention, such as will enable others skilled in the art to which it appertains to make and use the same.

This invention relates to conveyers or stirrers which embody a reciprocating rake or carrier provided with a plurality of rake blades that move in a trough or over any suitable surface on which the material to be stirred or conveyed is deposited. In certain prior constructions of this kind, the rake as a whole has been given a movement in an elliptical path and it has been found in practice that such an arrangement is not satisfactory in several instances, particularly where the device is used as a stirrer in a drying machine, since it leaves a body of unstirred material on the drying plate, which body acts as a non-conductor of heat and lessens to a marked degree the efficiency of the machine. When the rake blades move in an elliptical path the material on the drying plate (which is preferably constituted by a trough) will be formed into a series of waves or undulations, owing to the fact that each rake or hoe blade moves upward along a comparatively gradual curve at each end of the reciprocating movement, as will be understood. When the material is raked or plowed over the surface of a plate that is heated from beneath by means of a fire or other source of heat, as in drying machines and in some forms of roasting machines, to which applications conveyers or stirrers of this class are peculiarly well adapted, it is very clear that any dead or unstirred material lying on top of the plate will prevent the passage of the heat to the material that is being treated. Under these circumstances, my object is to avoid the defects enumerated and to so construct the conveyer or stirrer that any formation of comparatively permanent waves or undulations in the material on the drying plate will be prevented, the lower scraping edge of each rake or hoe blade moving throughout its pushing movement in a line parallel to the surface on which the material lies, the blade being then raised directly away from such surface to begin its return movement. The path of the rake is therefore not truly elliptical, as according to the constructions above mentioned, but has its lower run parallel to the surface of the drying plate substantially throughout the length of such path; this surface is usually a true plane but in some instances the drying plate may be curved, in which event the parallelism with it of the lower scraping run of the rake blades is maintained.

More specifically, the invention consists in the apparatus for giving the rake the movement indicated above, which apparatus may take a number of forms, as will hereinafter appear; and the invention also consists in a conveyer or stirrer that embodies superposed drying plates over which move in opposite directions and in non-elliptical paths corresponding series of rakes that are actuated from the same driving mechanism, as will appear more clearly from the following description.

Figure 2:
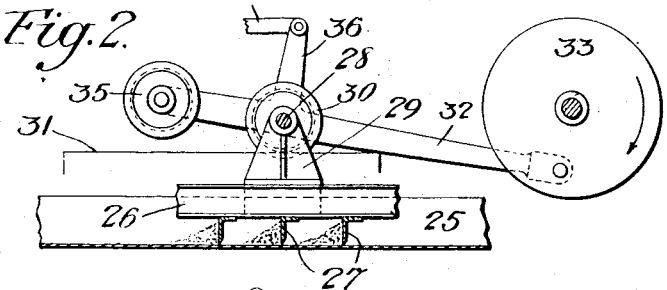
Figure 6:
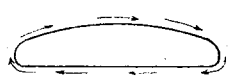
Figure 3:
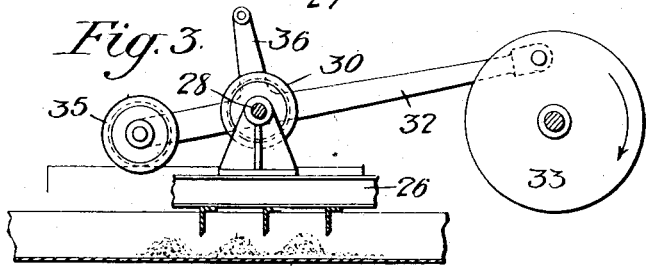
Figure 5:
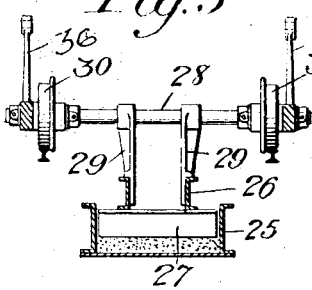
Figure 4:
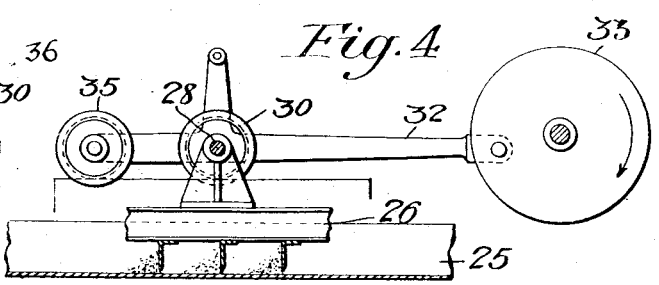

Reference is to be had to the accompanying drawing forming a part of this specification, and wherein; Figure 1 is a top plan view of a portion of a stirrer or conveyer embodying the invention; Figs. 2, 3 and 4 are longitudinal vertical sections of the same, showing the rake at different stages of its movement, Fig. 5 is a transverse section through the apparatus, Fig. 6 is a diagram of the orbit or path taken by the rake in a construction of this kind, Fig. 7 is a top plan view of a device wherein the rake is actuated by a modified form of actuating mechanism; Figs. 8, 9 and 10 are longitudinal vertical sections of the apparatus in different positions, Fig. 11 is a transverse section of the apparatus; Fig. 12 shows diagrammatically the path of the rake blades in this form of the device; Fig. 13 is a top plan view of a further modified construction; Figs. 14, 15, 16 and 17 are longitudinal vertical sections of the same apparatus, in different positions; Figs. 18 and 19 are a top plan view and a longitudinal section, respectively, of a still further modified form, wherein a plurality of drying plates and rakes are employed; Figs. 20 and 21 are detail longitudinal sections showing the apparatus of Figs. 18 and 19 in different positions; Fig. 22 is a transverse section through the same apparatus; and Fig. 23 is a diagram illustrating the course taken by the rake blades of the two series in this form.

Referring particularly to Figs. 1 to 6, the supporting plate 25, that is intended to act as a drying plate and receives the material to be stirred or conveyed, is preferably given the form of a trough, as is usual in this class of devices. Arranged longitudinally in the trough is the rake frame 26 that may be constructed in any appropriate way, but which is preferably formed of parallel beams or girders to the lower surfaces of which the rake or hoe blades 27 are attached, said blades being arranged at suitable distances from each other and extending transversely of the rake frame or carrier and the trough. The carrier 26 is supported at different points through its length from cross shafts 28 (of which only one is shown), each shaft supporting the carrier by means of brackets 29 and carrying at its ends flanged wheels 30 that travel on tracks or ways 31 extending parallel to the trough at the sides of the latter. The extreme ends of the shaft 28 are connected to the intermediate portions of connecting rods or pitmen 32 and one extremity of each connecting rod or pitman is connected to a driving wheel 33. These wheels are mounted on the ends of a shaft 34 that extends transversely to the trough at a point above the latter and is driven by power in any appropriate way. It will be noted that the tracks or ways 31 are horizontal in the embodiment shown, and in any case their upper surfaces are parallel to the longitudinal axis of the trough, as shown in Fig. 2, such upper surfaces being located substantially above the body of the trough. The ends of the pitmen 32 that are opposite to the driving wheels 33 are left free, and they carry flanged wheels or rollers 35, similar to the wheels or rollers 30 and adapted to travel on the same tracks or ways. Each pitman or connecting rod is provided adjacent its connection with the rake supporting shaft 28 with an upwardly extending arm 36 to the upper end of which is pivoted a connecting link or rod 37 (Fig. 2) by which the motion given to the carrier and blades at the point shown in the drawing is transmitted to other actuating mechanism, (not shown) at another point or points in the length of the device, according to the same principle involved in prior conveyers. According to this form of the apparatus, the driving wheels 33 are rotated in the direction of the arrows, Figs. 2, 3 and 4, and it will be noted that when the parts are in the position shown in Fig. 2 the wheels 30 will travel on the track toward the left, the end wheels 35 being elevated from the latter and the blades 27 moving in close proximity to or in contact with the bottom of the trough, whereby pushing of the material toward the left will be effected, as will be obvious. On a further movement of the driving wheels in the same direction the right hand ends of the connecting rods 32 will be raised into the position shown in Fig. 4, from which it appears that the wheels 35 will be depressed into contact with the ways 31, and all of the wheels 30 and 35 will then rest on the track and the rake blades will be raised from the bottom of the trough, as shown. On a further movement of the driving wheels, the wheels 30 will be raised from the track, carrying the rake blades upward to effect their return movement, the carrier and rake blades being then supported by means of the wheels 35 that travel on the track toward the right at this stage of the operation, as appears from Fig. 3. It will thus be seen that the rake blades are given a movement corresponding to that indicated in Fig. 6, wherein it appears that the lower run of the rake blades is along a right line, so that undulations in the material are prevented. One set of wheels (30) ride on the track during the lower half of the revolution of the driving wheel and the other set of wheels (35) ride on the track during the upper half of such revolution, the rake frame or carrier being attached to the set of wheels that is on the track when the blades are scraping or advancing the material along the trough. The rake frame can be attached to an axle connecting either set of wheels, as will be obvious, the only difference being that if they are attached to one axle the material is conveyed in one direction, while if attached to the other axle, it will be conveyed in the reverse direction. The characteristic feature of this construction is that the rake frame is attached to the connecting rods at the same points as the carrying wheels, and it is this feature which is factitive in producing a path or orbit such as shown in Fig. 6.

According to the modification shown in Figs. 7 to 12, one set of wheels (35) is dispensed with. The left hand ends of the connecting rods 32 have a slotted connection 38 with the upper ends of the links or arms 39, the lower ends of which are fixedly pivoted at 40 beneath the trough. The upper ends of said links or arms 39 extend above the track 31ˣ, which in this case is formed by lateral flanges on the trough itself, as shown in Fig. 7. The pivot 40 is preferably constituted by a cross rod 41 that connects the lower ends of the two arms 39, as indicated in Fig. 11. According to this form the rake is carried on the wheels 30 on the forward stroke (toward the left), and on the return stroke it is carried on the slotted swinging arms 39, thereby giving the rake blades a path or orbit similar to that indicated in Fig. 12.

Figs. 13 to 17 illustrate a simpler form in which the rake is carried by the wheels 30 on both the forward and backward stroke. In this case only one driving wheel 33 is employed and only one connecting rod 32, the end of said rod being secured to the shaft 28 intermediate of the ends of the latter. The carrier or rake frame 26 is supported from the wheeled shaft 28 by means of yokes 42 that extend upward from the carrier frame and are provided with vertical slots 43 in which the shaft 28 is freely movable. At the right of the shaft 28 the rake frame is equipped with another pair of slotted yokes 44 having vertical slots 45 in which a cross rod 46, passing through the intermediate portion of the connecting rod 32, is movable. It will be understood that with a construction of this kind the rake frame hangs from the wheeled frame or axle 28 by means of the yokes 42 on the forward conveying stroke, as shown in Fig. 17. On the return stroke the rake frame or carrier is suspended from the yokes 44, which in turn are supported on the cross pin or rod 46 of the connecting rod, as shown in Fig. 15. Different intermediate positions are shown in Figs. 14 and 16, and it will readily be apparent that the slots 43 and 45 of the yokes 42 and 44 permit the weight of the rake frame to be shifted from the wheeled shaft 28 to the cross pin of the connecting rod and vice versa; in order to produce the desired effect.

In some instances it is desirable to use a plurality of troughs and rake frames in the same apparatus in such a way that the rakes of the different series will be actuated oppositely. Such an arrangement is of peculiar utility in driers, roasters or other machines in which it is necessary to stir and advance the material at the same time. A construction of this kind is shown in Figs. 18 to 23, the device illustrated being a duplex one comprising an upper trough 25$^a$ and a lower trough 25$^b$, the arrangement being such that the material on the upper trough is stirred and advanced in the direction of the arrow to one end of the trough where it drops to the trough below and is stirred and advanced in the opposite direction by the rake blades of the lower rake frame. This is effected by connecting the ends of the connecting rods or pitmen 32$^\times$ to the intermediate portions of links 50 in the upper and lower ends of which are mounted cross shafts 51 and 52 respectively, the shaft 51 being equipped with wheels 53 that travel on the track constituted by the upper flanges 31$^\times$ of the upper trough, while the lower shaft 52 carries similar wheels 54 that travel on the flanges 31$^\times$ of the lower trough. The axles or shafts 51 and 52 are rigidly secured to the respective rake frames 26—26$^a$, whereby the latter are supported in proper relation to their troughs, and the wheels 53, 54 are free to revolve on these axles. The link 50 is also free to revolve about said axles. At a point remote from this actuating mechanism the rakes are connected by similar links 55, the ends of which are free to revolve about shafts or axles 56 and 57, which axles carry the rake frames and are equipped with wheels 58, 59, traveling on the flanges of the respective troughs as before. As the connecting rods 32$^\times$ are rigidly attached to the links 50, the revolution of the driving wheel in the direction of the arrow will cause the wheels 53 and 54, (and correspondingly the wheels 58 and 59) to ride alternately on the upper and lower tracks. It will be understood that the links 50 and 55, together with the axles 51, 52, 56 and 57, and the rake frames 26, form a jointed or articulated parallelogram, so that any motion imparted to the frame at the end adjacent the driving wheel, is transferred throughout its whole length, whereby the upper rake frame is always maintained parallel to the lower in all positions of the connecting rods, although it will be understood that the upper and lower rakes act alternately and in opposite directions, one raking the material while the other is lifted up and is returning over the top of the material, and vice versa, as is indicated in Figs. 20, 21 and 23. The non-elliptical path or orbit of each series of rake blades, as described, is produced as before. The great advantage of this arrangement is that an effective raking action is obtained with both rakes and that this is produced by the use of a single actuating mechanism in spite of the fact that the rakes are operated alternately and move the material in opposite directions, as above indicated.

The foregoing constructions are considered the best examples of the actual carrying out of my inventive idea, but it is obvious that I have not attempted to describe all of the numerous modifications which may be adopted without departing from the latter.

What I claim is:—

1. In a stirrer or conveyer, the combination of a surface on which the material is deposited, a rake, and operating mechanism comprising a driving member and a pitman connected to the driving member and the rake having a longitudinally reciprocating movement, and means for supporting said pitman alternately at different points in the length of said pitman, whereby the rake is caused to traverse an orbital path, one side of which is parallel with the surface aforesaid.

2. In a stirrer or conveyer, the combination of a surface on which the material is deposited, a rake, an operating mechanism for the rake comprising a driving member and a pitman connected to the driving member and the rake having a reciprocating movement longitudinally of the surface aforesaid, and means associated with said pitman to support the latter at different points in its length during its alternate movements, whereby the rake is caused to traverse an orbital path, one side of which is parallel with the surface aforesaid.

3. In a stirrer or conveyer, the combination of a surface on which the material is deposited, a rake to coact with said surface, and operating mechanism for the rake comprising a connecting member connected to the rake and means for supporting said connecting member at different points in the length of the member, according to different positions of the operating mechanism.

4. In a stirrer or conveyer, a surface on which the material is deposited, a rake to coact with said surface, and operating mechanism for the rake comprising a driving member, a connecting member operated thereby and connected to the rake, and separate devices for supporting said connecting member alternately at different points in the length of said member.

5. In a stirrer or conveyer, a surface on which the material is deposited, a rake, and rake reciprocating mechanism comprising a rotary driving member, a connecting member operated thereby and pivoted to the rake, and separate devices for supporting said connecting member on alternate strokes of the rake respectively.

6. In a stirrer or conveyer, a surface on which the material is deposited, a rake, and rake reciprocating mechanism comprising a rotary driving member, a connecting member operated thereby and connected to the rake, and separate devices for supporting said connecting member at different points in the length of said rod, one of said devices being operative on the pushing or conveying stroke and the other being operative on the return stroke.

7. The combination of superposed conveyer troughs, rakes operating in said troughs, links connecting the rakes and forming therewith a jointed parallelogram, and means to operate the links to effect an endless travel of each rake.

8. The combination of superposed conveyer troughs, rakes movable endwise in said troughs, links connecting the rakes and forming therewith a parallelogram, wheels carried by the respective rakes at the apices of the parallelogram and traveling on tracks at the sides of the troughs, and means connected with certain of the links to effect the traveling of the wheels on the tracks and the raising of the former away from the latter at predetermined points, whereby each rake is moved in an endless path.

9. In a conveyer, a parallelogrammic frame comprising oppositely located rakes, connections between said rakes, means for actuating the connections, and means coöperating with said first-named means to cause the rakes to travel in orbital paths the lower runs of which are parallel.

10. In a conveyer, a parallelogrammic frame comprising oppositely located rakes, and connections between said rakes in combination with surfaces over which said rakes work, means for actuating said connections, and means coöperating with said first-named means whereby the rakes are simultaneously but oppositely actuated and caused to travel in orbital paths the lower runs of which are parallel to said surfaces.

In testimony whereof I affix my signature, in presence of two witnesses.

DAVID J. NEVILL.

Witnesses:
BURT STEARNS,
M. B. BAGLEY.